United States Patent [19]
Jorgensen

[11] 3,868,134

[45] Feb. 25, 1975

[54] REMOTE CONTROLLED GAS CAP LOCK

[76] Inventor: Holger Jorgensen, 610 Alliance Ave., Toronto, 334 Ontario, Canada

[22] Filed: Sept. 4, 1973

[21] Appl. No.: 394,158

[52] U.S. Cl............ 292/28, 220/24 GT, 220/55 G, 280/5 A, 292/225, 292/DIG. 25
[51] Int. Cl............................................ B65d 55/14
[58] Field of Search............ 70/163, 164, 165, 166, 70/167, 168, 169, 170, 171, 172, 173, 256; 292/24, 25, 26, 27, 28, 29, 30, 50, 125, 225, DIG. 4, DIG. 25, DIG. 72; 220/24 GT, 55 G

[56] References Cited
UNITED STATES PATENTS

| | | |
|---|---|---|
| 206,713 | 8/1878 | Fernandez.......................... 292/125 |
| 545,277 | 8/1895 | Feinberg............................ 292/340 |
| 965,590 | 7/1910 | Lokody............................... 70/169 |
| 1,788,473 | 1/1931 | Smith.................................. 70/170 |
| 1,862,229 | 6/1932 | Mattern.............................. 70/159 |
| 1,918,093 | 7/1933 | Gang................................... 70/255 |

FOREIGN PATENTS OR APPLICATIONS 1,384,865  11/1964  France................................. 70/256

Primary Examiner—Albert G. Craig, Jr.
Attorney, Agent, or Firm—Howard I. Podell

[57] ABSTRACT

A device for locking a cap of the fuel tank of a motor vehicle, which is controlled from the driver's position of the automobile by means of a cable mechanism.

1 Claim, 3 Drawing Figures

PATENTED FEB 25 1975　3,868,134

REMOTE CONTROLLED GAS CAP LOCK

SUMMARY OF THE INVENTION

My invention relates to a lock mechanism for a gas cap of a motor vehicle. This locking system for the gas cap can be operated by a remote control cable system from the driver's position of an automobile.

An advantage of my invention is that it is adaptable to installation on conventional automobiles.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
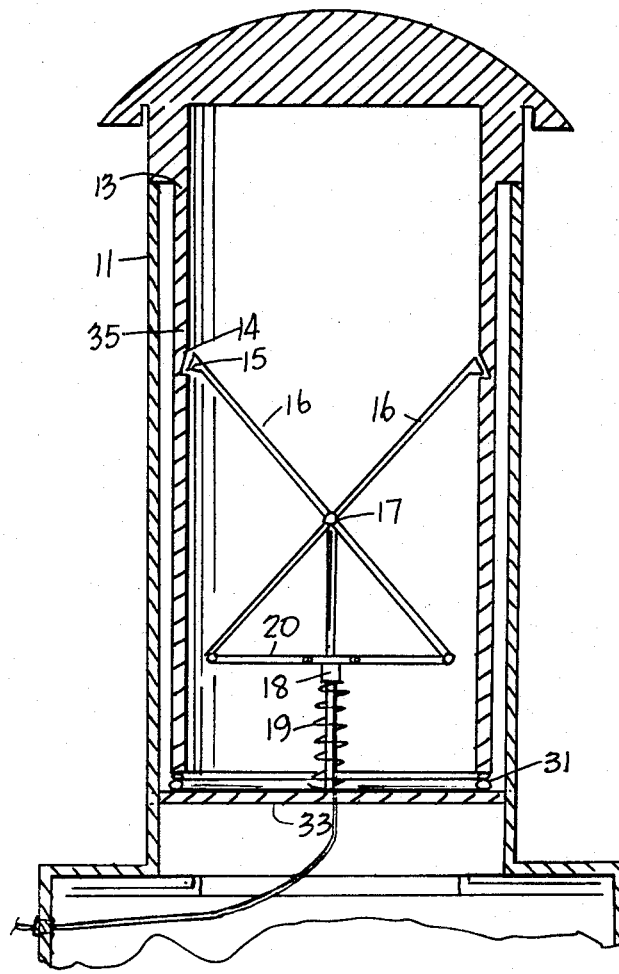
FIG. 1 illustrates a side sectional view of a filler tube of a fuel tank and locking mechanism.
Figure 2:
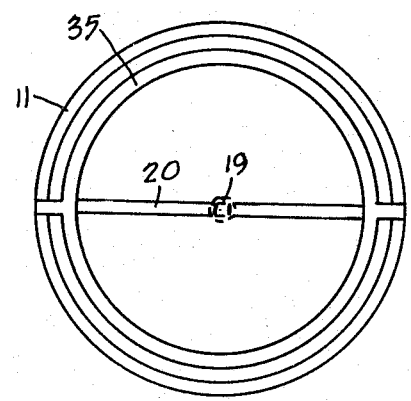
FIG. 2 illustrates a bottom view of the locking mechanism.
Figure 3:
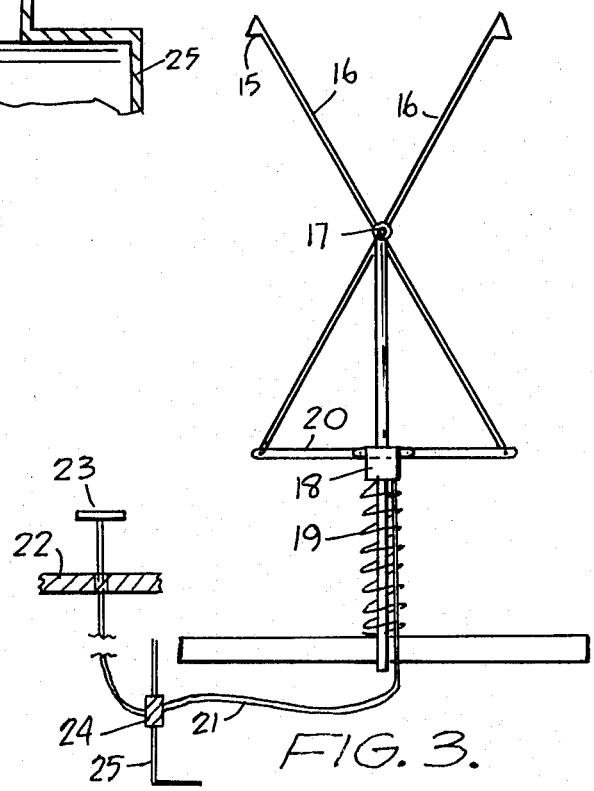
FIG. 3 illustrates a side view of the locking mechanism.

Turning now descriptively to the drawings, in which similar reference characters denote similar elements throughout the several views, FIGS. 1-3 illustrate the handle 23 located at the driver's position of a vehicle which is attached to a flexible cable 21 which goes through the floor 22 of the automobile and through sleeve joint 24 of the gasoline tank 25 to attach to joint sleeve 18 of the lock mechanism 10 in the filler tube 11. Joint sleeve 18 is connected to transverse stabilization bar 20 and spring 19 and rides on fixed axial rod 32. When cable 21 is pulled, spring 19 is compressed by sleeve 18, and movement of stabilization bar 20 draws attached linked arms 16 out of locking engagement with the neck 13 of filler cap 13. Linked arms 16 are joined together by pivot connection 17 and are formed of flexible, spring metal. When arms 16 are pulled by stabilization bar 20, shaped jaw 15 at the end of each arm 16 is released from shaped recess 14 in the inner wall of the tube 35 of gas cap 13. Gas cap 13 is shaped with a tubular projection 34 that fits inside of the inlet pipe 11 of the fuel tank 25. The end of tube 35 of tank cap 13 seats against a coil spring 31 which releases the unlocked cap. When manual tension is released from cable 21, spring 19 pushes against sleeve 18 to move stabilization bar 20 and arms 18 so as to latch arm jaws 15 in the recess 14 of the fuel tank cap 13, when fuel tank cap 13 is manually seated against coil spring 31.

Axial rod 32 is fixed to cross bar 33 attached to the inlet tube 11 of the fuel tank.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters Patent of the United States is:

1. A latching mechanism for fastening a cap of a fuel tank of an automobile to the tank filler tube, with said latching mechanism controlled by a flexible cable which is operated from a remote position, in which the cap of the fuel tank is fitted with a tubular projection that extends into the tube of the fuel tank filler tube, in the closed position, said tubular projection formed with a recess on its internal wall, and said latching mechanism mounted inside the fuel tank filler tube, shaped to engage in the closed position the recess in the wall of the tubular projection of the cap, with said flexible cable fastened through a sleeve joint in the fuel tank wall to the latching mechanism.

* * * * *